Feb. 16, 1926.

G. H. ALDRICH ET AL 1,572,981

POULTRY FEEDER

Filed March 18, 1925

Inventors
G. H. Aldrich.
A. L. Gilbo.

By Lacey & Lacey, Attorneys

Feb. 16, 1926.

G. H. ALDRICH ET AL 1,572,981

POULTRY FEEDER

Filed March 18, 1925      2 Sheets-Sheet 2

Inventors
G. H. Aldrich.
A. L. Gilbo.
By
Lacey & Lacey, Attorneys

Patented Feb. 16, 1926.

1,572,981

UNITED STATES PATENT OFFICE.

GEORGE H. ALDRICH AND ALFRED L. GILBO, OF WESTMORELAND DEPOT, NEW HAMPSHIRE.

POULTRY FEEDER.

Application filed March 18, 1925. Serial No. 16,516.

*To all whom it may concern:*

Be it known that we, GEORGE H. ALDRICH and ALFRED L. GILBO, citizens of the United States, residing at Westmoreland Depot, in the county of Cheshire, and State of New Hampshire, have invented certain new and useful Improvements in Poultry Feeders, of which the following is a specification.

This invention relates to devices for feeding poultry and is intended more particularly for feeding dry mash. The object of the invention is to provide a simple inexpensive device which will prevent excessive flow of the feed to the feeding trough and in which the parts may be easily disassembled to permit cleaning or repairs when needed. The invention is illustrated in the accompanying drawings and will be hereinafter fully set forth and defined.

Figure 1:
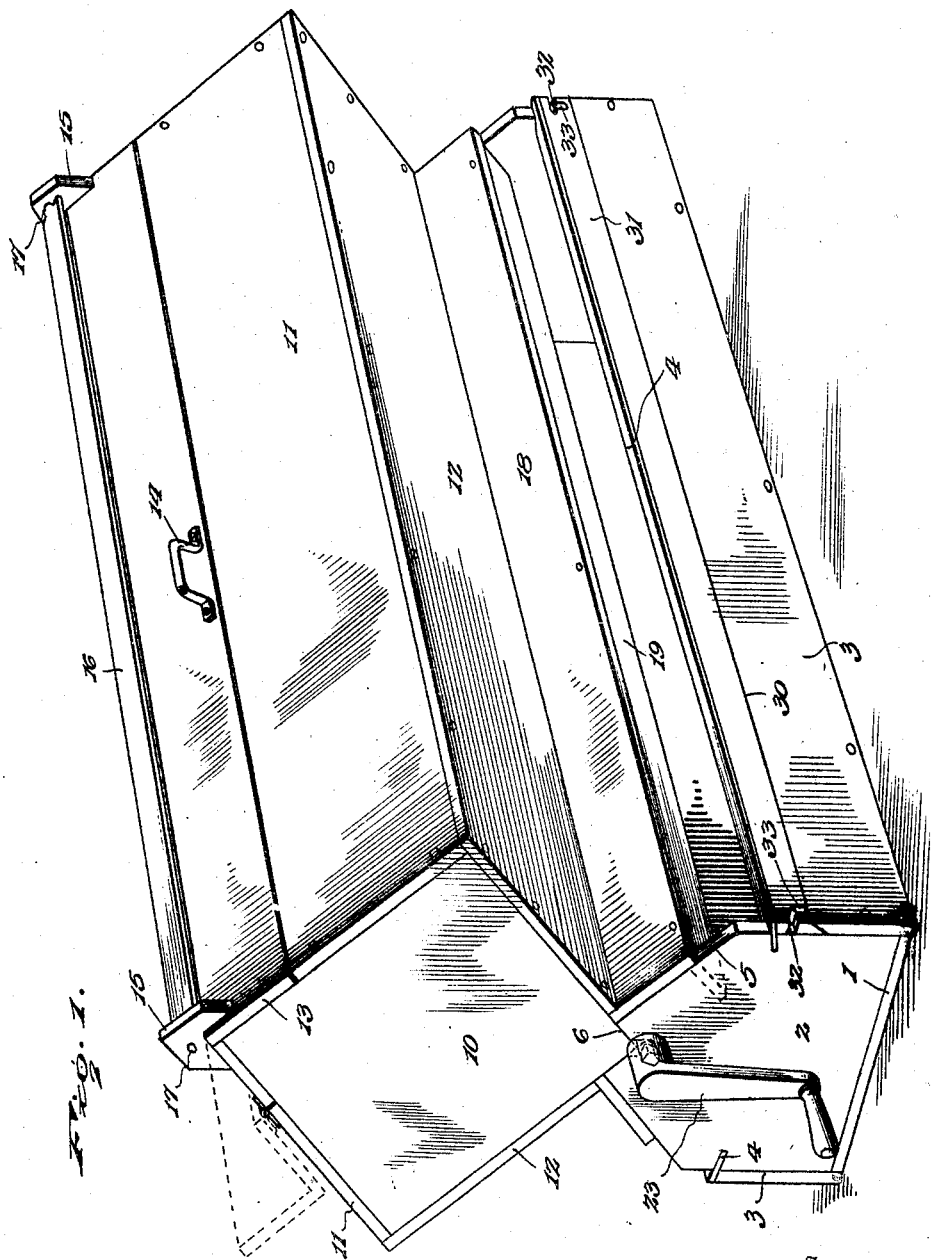
Figure 1 is a perspective view of a feeder embodying our improvements.
Figure 2:
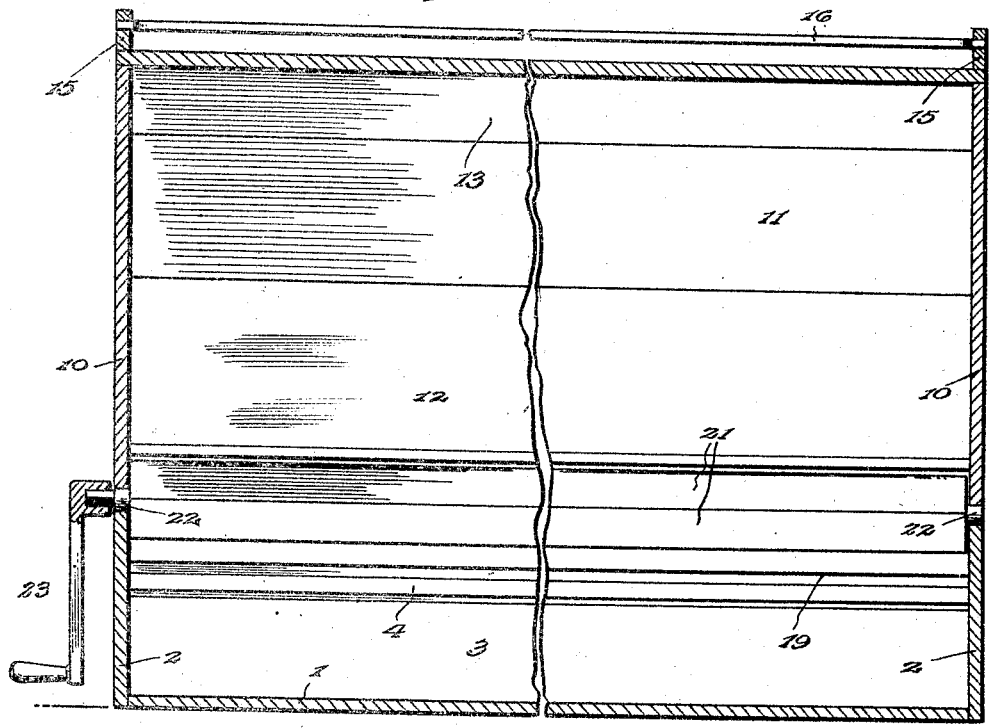
Fig. 2 is a vertical longitudinal section of the same.

In carrying out the invention, we provide a trough consisting of a bottom 1, end walls 2 and side walls 3 which are firmly secured in proper relation, as shown in the drawings. The end walls extend to a greater height than the side walls and along the upper edges of the side walls we secure the inwardly and downwardly projecting lips 4 which restrict the access of the poultry to the feed and prevent the feed from overflowing the upper edges of the side walls, thereby eliminating waste. The upper edges of each end wall converge upwardly and inwardly, as shown at 5, and at the apex of each end wall the edge is cut inwardly to define a substantially V-shaped recess 6 in which the ends of a hopper 7 may be seated. Extending downwardly from the V-shaped recess is a notch, indicated at 8, which constitutes a bearing for one end of an agitator or feeder 9. The hopper 7 consists of end walls 10 which are preferably square and disposed with opposite corners in the same vertical plane so that a lower corner of each end wall may fit within a recess 6 in the corresponding end wall of the trough so that the hopper will be supported upon the trough without being permanently secured thereto. Extending between the end walls 10 and secured thereto are side walls each consisting of an upper member 11 and a lower member 12, the upper members 11 diverging downwardly, as shown clearly in Figs. 1 and 3. The side members terminate short of the upper and lower corners respectively of the end walls 10 and to the upper edge of one upper side member 11 is hinged a lid 13 which is substantially A-shaped in cross section and is adapted to rest at its ends upon the edges of the end walls 10 and span the same, a handle 14 of any preferred form being secured to the lid adjacent the free edge of the same. Secured upon the lid at the ends thereof are brackets 15 and extending between the said brackets is a shield 16 having round tenons or trunnions 17 at its ends pivotally fitted in the said brackets so that the said shield or bar may rotate easily. Should the poultry attempt to roost upon the lid, they will light upon this shield or bar 16 which will immediately rotate under their weight and, consequently, the fowls will be dislodged and will be prevented from roosting upon the device. Obviously, as the side members of the hopper are disposed obliquely, they do not furnish any foot hold upon which the fowls may roost.

Figure 3:
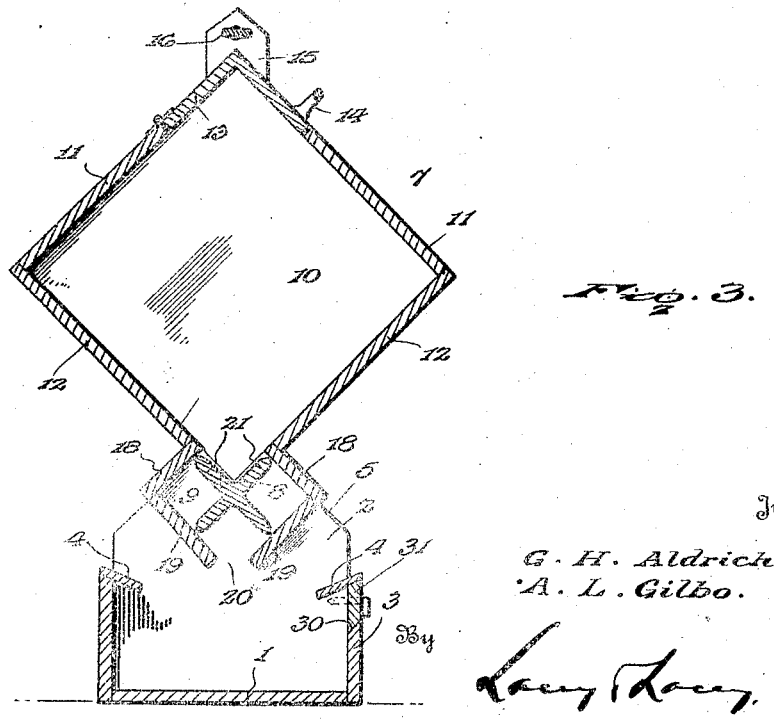
Fig. 3 is a vertical transverse section.

Secured to the lower edges of the lower side members 12 are rails 18 which extend the full length of said side members whereby their ends may rest upon the edges 5 of the end walls 2 of the trough, as shown clearly in Fig. 1, the said rails 18 being disposed at right angles to the respective side walls 12 of the hopper so that they diverge downwardly and conform to the inclination of the upper edges of the trough. Secured to the outer lower edges of the rails 18 are inwardly and downwardly converging strips or rails 19 which extend at right angles to the respective rails 18, as shown clearly in Fig. 3, and fit between the end walls of the trough, the dimensions of the rails 18 and 19 being such that they define a feeding or agitating chamber extending the full length of the trough at the top of the same and furnish a restricted opening 20 between the lower edges of the strips 19 through which the feed may pass into the trough. The agitator 9 consists of a plurality of blades 21 arranged in cruciform relation at right angles to each other and extending radially from the axis of the agitator, the width of the blades being such that their outer edges lie close to but out of actual contact with the rails 18 and 19. The agitator is provided with trunnions 22 at its ends which seat in the notches 8 and a handle 23 is engaged with or secured to one end of the agitator whereby to rotate the same when necessary. Normally the agitator will be so disposed that its upper blades, in effect, form continuations of the lower side members 12 of the hopper, as shown in Fig. 3, and thereby prevent the flow of feed from the hopper to the trough. When the supply of feed in the trough has been consumed, the agitator or feeder is rotated and a fresh supply of feed will then be permitted to pass from the hopper to the trough and will be positively fed through the agitating chamber by the rotation of the agitator. Excessive flow of the feed and consequent waste thereof is thus prevented and the feeding is controlled in a very easy and simple manner.

It is to be particularly noted that the hopper is not attached to the trough, the ends of the rails 18 and the lower corners of the end walls 10 of the hopper simply resting upon the upper edges of the end walls 2 and within the recesses 6 so that the hopper may be easily lifted from the trough whenever cleaning or repairing of the device is necessary. The agitator is, of course, lifted from the trough with the hopper inasmuch as the outlet passage 20 is of less width than the agitator and, consequently, the agitator cannot pass through said opening. After the hopper has been removed from the trough, however, the agitator may be slid endwise from the mixing chamber defined by the rails 18 and 19 in an obvious manner so that all of the parts may be thoroughly cleaned. Endwise movement of the hopper and the agitator upon the trough is prevented by the engagement of the ends of the lower rails 19 between the end walls of the trough, and the ends of the agitator blades are likewise disposed between the end walls of the trough. The lid is disposed at the apex of the hopper so that the hopper may be easily filled to the limit of its capacity and the downwardly converging arrangement of the lower portions of the side walls of the hopper causes the feed to pass by gravity to the agitator so that the flow of the feed into the trough is thoroughly controlled. Obviously, the guard lips 4 are spaced from the rails 19 so that openings are provided through which the poultry may have access to the feed in the trough and, if desired, spacing bars may be placed upon the lips 4 to prevent crowding of the fowls while they are feeding. Our device is exceedingly simple and may be produced at a low cost and easily and economically kept in a proper state of repair and sanitation.

While the device may be made in various sizes, it may be desirable at times, to be able to accommodate very young chicks at the same feeder which supplies older and larger fowls. To this end, one side wall 3 may be divided, as at 30, forming a strip 31 below the lip 4, the opposed edges of the wall and the strip being beveled, as clearly shown, so as to aid in holding the strip in place. The strip 31 has notches 32 in its ends through which screw hooks 33, or the like, may be inserted into the edges of the end walls. When it is desired to permit the young chicks to feed, the strip 31 is removed, and it may be secured at a higher point or temporarily laid aside.

Having thus described the invention, we claim:

1. A poultry feeder comprising a trough having its end walls extending above its side walls, a hopper resting upon the end walls of the trough and freely removable therefrom, an agitating chamber secured to the bottom of the hopper to fit within the upper portion of the trough and freely removable from the trough with the hopper, the ends of the agitating chamber being open and fitting between the end walls of the trough to prevent endwise movement of the hopper and the agitating chamber upon the trough, and an agitator extending longitudinally of the agitating chamber and removable through the open ends thereof when the hopper and the agitating chamber are removed from the trough.

2. A poultry feeder comprising a trough having its end walls extending above its side walls, a hopper resting upon the end walls of the trough and freely removable therefrom, and an agitating chamber secured to the bottom of the hopper to fit within the upper portion of the trough and freely removable from the trough with the hopper, the ends of the agitating chamber fitting between the end walls of the trough to prevent endwise movement of the hopper and the agitating chamber upon the trough.

3. A poultry feeder comprising a trough having inwardly projecting overhanging guard lips along the upper edges of its side walls, the end walls of the trough extending above the side walls thereof, a hopper resting upon the end walls of the trough, and an agitating chamber carried by the lower end of the hopper and normally fitting within the top of the trough with the lower walls of the agitating chamber spaced from the guard lips of the trough to define feeding openings.

4. A poultry feeder comprising a trough having its end walls extending above its side walls and provided in their upper edges with central recesses and notches in the bases of said recesses, a hopper resting upon the end walls of the trough and having its end walls seating in the recesses in the end walls of the trough, outwardly and downwardly diverging rails secured to the bottom of the hopper and resting upon the end walls of the trough, downwardly and inwardly converging rails secured to the first-mentioned rails and fitting within the trough with their lower edges in spaced relation to define a feed outlet, and an agitator extending longitudinally of the trough between the said rails and having its ends rotatably seated in the notches in the end walls of the trough.

5. A poultry feeder comprising a trough having its end walls extending above its side walls and having the upper edges of said end walls inclined upwardly and inwardly from the respective side walls and provided with V-shaped recesses at their centers, a hopper comprising end walls having lower corners seated in the central recesses of the end walls of the trough and including downwardly converging side walls secured to said hopper end walls and terminating at the end walls of the trough, rails carried by the lower edges of said side walls and defining an agitating chamber, and an agitator rotatably mounted in the end walls of the trough and housed between said rails.

In testimony whereof we affix our signatures.

GEORGE H. ALDRICH. [L. S.]
ALFRED L. GILBO. [L. S.]